United States Patent [19]
Pons et al.

[11] Patent Number: 5,975,647
[45] Date of Patent: Nov. 2, 1999

[54] WHEEL HUB UNIT

[75] Inventors: Luciano Pons; Angelo Vignotto, both of Pinerolo, Italy

[73] Assignee: SKF Industrie S. p. A., Turin, Italy

[21] Appl. No.: 08/984,603

[22] Filed: Dec. 3, 1997

[51] Int. Cl.⁶ .................................................. B60B 27/00
[52] U.S. Cl. ........................................................ 301/108.1
[58] Field of Search ............................ 301/108.1, 108.2, 301/108.3, 108.4, 108.5, 37.1, 37.37, 37.21

[56] References Cited

U.S. PATENT DOCUMENTS

| | | | |
|---|---|---|---|
| 1,665,437 | 4/1928 | Booth | 301/37.1 |
| 1,816,643 | 7/1931 | Forsyth | 301/37.1 |
| 2,022,041 | 11/1935 | Kliesrath | 301/37.1 |
| 3,538,511 | 11/1970 | Asberg . | |
| 3,767,221 | 10/1973 | Asberg . | |
| 3,884,331 | 5/1975 | Asberg . | |
| 4,067,621 | 1/1978 | Reppert | 301/108.1 |
| 4,270,805 | 6/1981 | Spisak | 301/37.35 |
| 4,383,588 | 5/1983 | Krude . | |
| 4,544,209 | 10/1985 | Braungart | 301/37.21 |
| 4,621,700 | 11/1986 | Merkelbach . | |
| 4,792,020 | 12/1988 | Okumura et al. . | |
| 4,880,281 | 11/1989 | Merkelbach . | |
| 5,366,279 | 11/1994 | Polka | 301/108.1 |
| 5,590,967 | 1/1997 | Kapaan . | |

FOREIGN PATENT DOCUMENTS

| | | |
|---|---|---|
| 0 371 836 | 6/1990 | European Pat. Off. . |
| 0 680 836 | 11/1995 | European Pat. Off. . |
| 0 073 130 | 3/1996 | European Pat. Off. . |
| 2 723 886 | 3/1996 | France . |
| 1 189 877 | 3/1965 | Germany . |
| 26 35 608 | 2/1978 | Germany . |
| 29 19 411 | 11/1980 | Germany . |
| 39 00 356 | 7/1990 | Germany . |

*Primary Examiner*—D. Glenn Dayoan
*Assistant Examiner*—Long Bao Nguyen
*Attorney, Agent, or Firm*—Merchant & Gould P.C.

[57] ABSTRACT

A wheel hub unit (1), particularly for a motor vehicle, comprises a hub (2) having a centering. sleeve portion (3) axially projecting from a radial side surface (10) of the hub and defining an inner through bore (4), an axle (5) rotatably supporting the hub (2), a wheel (6) with a radially inner annular rim (7) defining a centering bore (8) for fitting onto the hub sleeve portion (3), and a cover (9) for closing the through bore (4). The cover (9) is forcefully fitted over a radially outer surface (15) of the hub sleeve portion (3) such that a cylindrical portion (21) of the cover (9) is interposed between the annular rim (7) of the wheel (6) and the radially outer surface (15) of the hub sleeve portion (3).

9 Claims, 1 Drawing Sheet

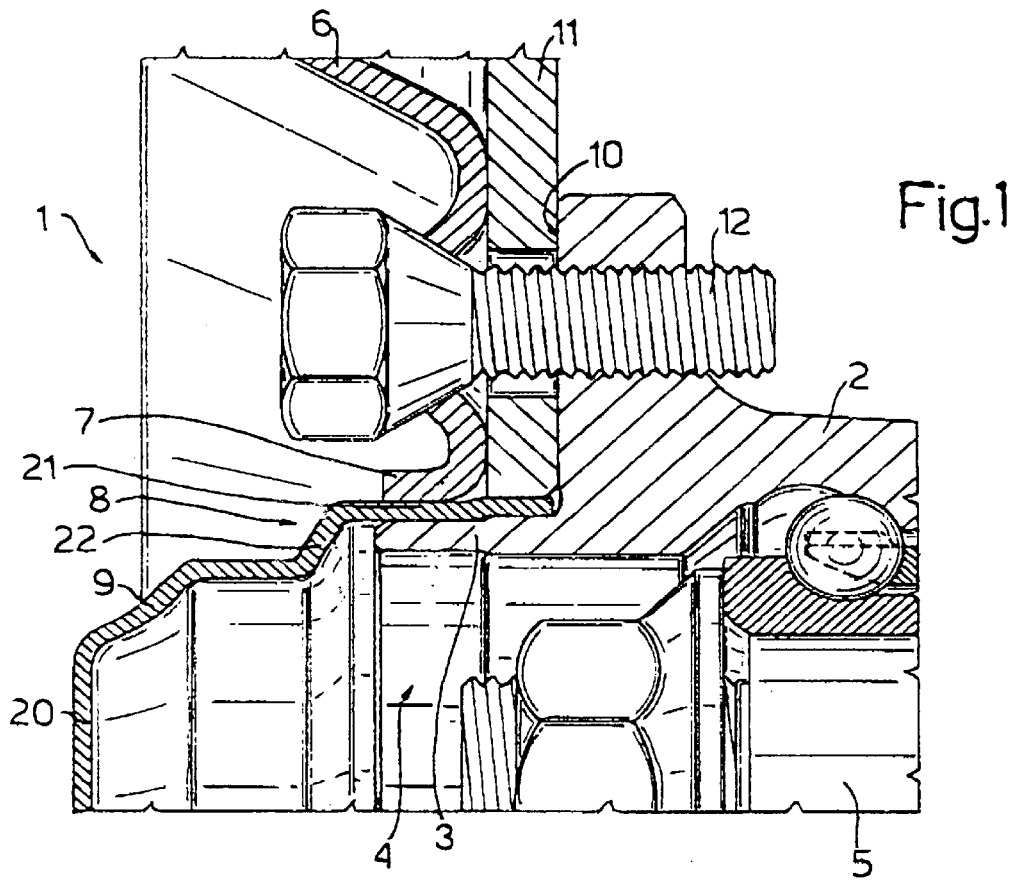
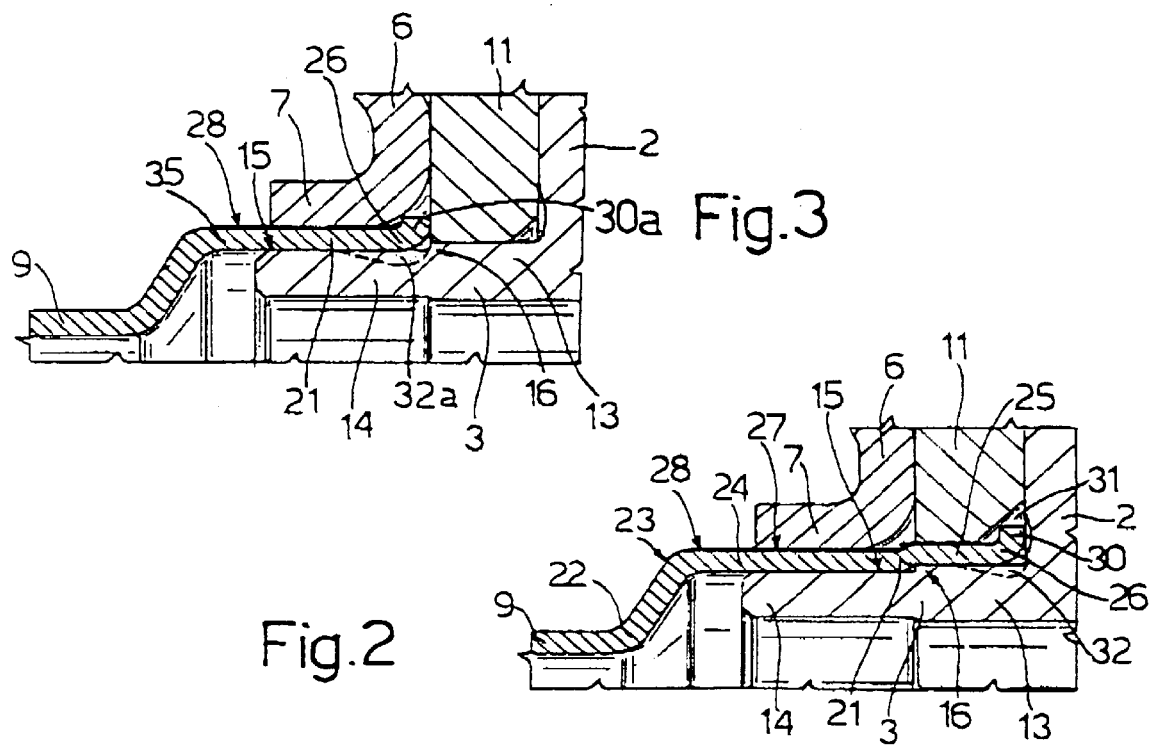

WHEEL HUB UNIT

DESCRIPTION

The present invention refers to a wheel hub unit, particularly for a motor vehicle.

BACKGROUND OF THE INVENTION

As is well known in the art, motor vehicle wheels are mounted to hubs fast for rotation with an axle journal or an axle shaft, according to the specific function of the wheel.

It is known to use a cover, generally made of sheet metal, to close the through bore at the center of the hub in order to prevent external agents from reaching and contaminating the axle and the other hub components, for example the hub bearing.

In conventional solutions, the cover is forcefully fitted inside a centering sleeve portion or spigot axially projecting from the hub. The wheel forms a radially inner annular rim by which it is then mounted and centered onto said spigot.

This solution, although widely applied, has some drawbacks. Particularly, the contacting surfaces between the hub and the wheel and between the hub and a radial flange of an optional brake member (disc or drum) are likely to suffer from corrosion caused by external contaminants. Corrosion is also caused by the differential of galvanic potential between the different metallic materials which these components are made of. The intensity and entity of the corrosion is proportional to such difference of galvanic potential. This problem is particularly felt with light metal alloy wheels.

To avoid this inconvenience, said components have to be made out of special materials, thereby increasing manufacturing costs. Alternatively, the hub spigot must undergo an anti-corrosion processing, which is extremely difficult to attain with satisfactory results.

SUMMARY OF THE INVENTION

It is an object of the present invention to provide a unit capable of overcoming the above mentioned prior art drawbacks. Particularly, it is an object of this invention to provide a wheel hub unit of simple and cost-effective design, capable of avoiding corrosion at the interface between the wheel and the hub.

In accordance with one aspect of the invention as claimed, these objects are accomplished by the provision of a wheel hub unit, particularly for a motor vehicle, comprising a hub having a centering sleeve portion axially projecting from a radial side surface of said hub and defining an inner through bore, an axle rotatably supporting the hub, a wheel with a radially inner annular rim defining a centering bore for fitting onto said hub sleeve portion, and a cover for closing said through bore; wherein said cover is forcefully fitted over a radially outer surface of said hub sleeve portion such that at least one cylindrical portion of said cover is interposed between said annular rim of the wheel and said radially outer surface of said hub sleeve portion.

Preferably, at least a radially outer surface of said at least one cylindrical portion of the cover is provided with an anti-corrosion layer.

As a result, the wheel hub unit in accordance with the present invention provides for efficient protection of the hub from external contaminants. Moreover, the cover of the hub unit, before being assembled to remainder of the unit, can be easily subjected to an anti-corrosion protective processing, particularly as to its portion to be fitted between the hub and the wheel, so as to prevent corrosion from occurring at the hub/wheel interface.

BRIEF DESCRIPTION OF THE DRAWINGS

In order that the present invention may be well understood there will now be described a few preferred embodiments thereof, given by way of example, reference being made to the accompanying drawings, in which:

FIG. 1 schematically depicts an axial cross-sectional view of a wheel hub unit according to the present invention;

FIG. 2 shows a detail of the unit of FIG. 1 to an enlarged scale; and

FIG. 3 shows a variant embodiment of the unit of FIG. 1.

DETAILED DESCRIPTION OF PREFERRED EMBODIMENTS

Referring to FIGS. 1 and 2, designated overall at 1 is a wheel hub unit in accordance with the present invention.

Unit 1 comprises a hub 2 provided with a centering sleeve portion 3 defining an inner through bore 4, an axle journal 5 rotatably supporting the hub 2, a wheel 6 with a radially inner annular rim 7 defining a centering bore 8 for fitting onto sleeve portion 3, and a cover 9 closing the through bore 4.

The hub 2, of substantially conventional design, in particular provides a radially oriented side surface 10 facing the wheel 6. Abutting side surface 10 is a radial flange 11 of a brake member (of the disc or drum type), of known kind and not shown in further detail. Brake flange 11 is axially interposed, in known manner, between the hub 2 and the wheel 6, the latter being secured to the hub 2 by fastening bolts 12.

Sleeve portion 3 projects axially from the side surface 10 of hub 2. Sleeve portion 3 forms a connection portion 13 providing connection to the side surface 10 and an axial end portion 14. Both portions 13 and 14 are cylindrical in shape but have different diameters; more particularly, in accordance with a conventional constructional design, the outer diameter of axial end portion 14 is smaller than that of connecting portion 13, in order to facilitate centering of the brake flange 11 and the wheel 6, which are produced with different tolerances. Accordingly, the radially outer surface 15 of sleeve portion 3 provides an annular step 16 at the junction of portions 13 and 14.

The cover 9 is of a substantially cup-like shape, the concavity of which is oriented facing the axle 5. Particularly, cover 9 comprises an end wall 20, a substantially cylindrical end portion 21 opposite to end wall 9, and a connecting portion 22 joining end wall 20 to cylindrical end portion 21.

The cylindrical end portion 21 is so shaped as to copy the contour of the radially outer surface 15 of sleeve portion 3. Therefore, the cylindrical end portion 21 provides, beginning from a connecting section 23 adjacent to connecting portion 22, two consecutive cylindrical sections 24, 25 of different diameter. Particularly, as shown in FIG. 2, the first cylindrical section 24, adjacent to section 23, is of smaller diameter with respect to the second section 25 The second section 25 terminates, opposite to the first section 24, with a radially folded end rim 26 of annular shape.

A radially outer surface 27 of cylindrical end portion 21 has a contour which corresponds to that of the radially outer surface 15 of sleeve portion 3, in order to allow to center the wheel 6 and the brake flange 11 on the cover 9, as will be apparent herein after.

The radially outer surface 27 of cover 9 (and, optionally, also the radially inner surface) is provided with an anti-corrosion layer 28 applied with known processes before the unit 1 is assembled.

The annular end rim 26 of cover 9 is folded radially outwardly, so as to provide an annular locking detent 30 that in use remains inserted in a seat 31, for example formed by beveling a radially inner edge of the brake is member flange 11, so as to prevent the cover 9 from coming off.

During assembly, the cover 9 is forcefully fitted onto the hub 2. Specifically, the cylindrical end portion 21 of cover 9 is forcefully fitted onto the hub sleeve portion 3, at a radially outer location with respect to sleeve portion 3. The two cylindrical sections 24, 25 of cylindrical end portion 21 are coupled to portions 14, 13 of the sleeve portion 3, respectively.

Then, the brake member 11 and the wheel 6 are fitted engaging the cylindrical sections 25 and 24 of cover 9, respectively.

In this way both the brake member 11 and the wheel 6 can be positioned accurately on the two elements 25 and 24, respectively, of cover 9.

In use, owing to the above described arrangement, the cover 9 is interposed between the annular rim 7 of wheel 6 and the sleeve portion 3 of hub 2. As a result, the hub is protected from external contaminants. In addition, the provision of the anti-corrosion layer 28 applied to the cover 9 avoids the risk of local corrosion at the contact zone between the cover 9 and the hub 2.

As already mentioned, in order to prevent the cover 9 from slipping off axially as the wheel 6 rotates, the end section 25 of cover 9 is folded radially outwardly, such that the annular detent 30 remains within seat 31.

As an alternative or addition to such solution, as shown in phantom line in FIG. 2, an annular groove 32 can be formed in the radially outer surface 15 of sleeve portion 3, particularly at the free end of cover 9. A portion of the cover, e.g. the annular end rim 26, can so be dented into annular groove 32.

In accordance with a variant embodiment, shown in FIG. 3, the cover 9 extends with its cylindrical end portion 21 only over the axial end portion 14 of hub sleeve portion 3, and not on the connecting portion 13. Therefore, cylindrical end portion 21 of the cover consists of a single cylindrical element 35, forcefully fitted to the radially outer surface 15 of hub sleeve portion 3 and extending proximate to the annular step 16.

In similar manner as described with reference to FIGS. 1 and 2, the cylindrical element 35 is radially interposed between the radially inner sleeve portion 3 of hub 2 and the radially outer annular rim 7 of wheel 6. As in known solutions, the brake member flange 11 is directly inserted on sleeve portion 3, more specifically on connecting portion 13.

Still referring to the embodiment of FIG. 3, in order to prevent the cover 9 from slipping off axially as the wheel 6 rotates, the end annular rim 26 of cover 9 is folded radially outwardly, so as to provide a locking annular detent 30a, axially locked by the wheel 6. As apparent, also in this case the cover can be stopped from coming off by denting portions of the cover in suitable grooves, for example in an annular groove 32a formed in the radially outer surface 15 of sleeve portion 3 and shown in phantom in FIG. 2.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing example. The scope of the invention is to be limited only by the appended claims.

We claim:

1. A wheel hub unit, particularly for a motor vehicle, comprising a hub having a centering sleeve portion axially projecting from a radial side surface of said hub and defining an inner through bore, an axle rotatably supporting said hub, a wheel with a radially inner annular rim defining a centering bore for fitting onto said hub sleeve portion, and a cover for closing said through bore, wherein said cover is forcefully fitted over a radially outer surface of said hub sleeve portion such that at least one cylindrical portion of said cover is interposed between said annular rim of the wheel and said radially outer surface of said hub sleeve portion.

2. A wheel hub unit as claimed in claim 1, wherein at least a radially outer surface of said at least one cylindrical portion of the cover is provided with an anti-corrosion layer.

3. A wheel hub unit as claimed in claim 1, wherein said hub sleeve portion comprises a first connection portion providing connection to said side surface and a second axial end portion, said first and second portions being of different outer diameter and defining, at a junction therebetween, an annular step; said cover extending at least over said second, axial end portion of the hub sleeve portion proximate to said annular step.

4. A wheel hub unit as claimed in claim 3, wherein said radially inner annular rim of the wheel is inserted onto said cylindrical portion of the cover; a radial flange of a brake member abutting against said side surface of the hub and being inserted onto said connection portion of the hub sleeve portion.

5. A wheel hub unit as claimed in claim 3, wherein said cover comprises two cylindrical cover sections of different diameter so shaped as to couple with said second portion and said first connection portion, respectively; said radially inner rim of the wheel being inserted on a first section of smaller diameter of said two cylindrical cover sections; a radial flange of a brake member abutting against said side surface being inserted on a second section, of greater diameter, of said two cylindrical cover sections.

6. A wheel hub unit as claimed in claim 4, further comprising locking means for preventing said cover from coming off the hub in the axial direction.

7. A wheel hub unit as claimed in claim 6, wherein said locking means are comprised of an annular detent radially outwardly projecting from an annular end rim of the cover, said cover rim being adapt for axially interfering with said wheel rim and/or said brake member flange.

8. A wheel hub unit as claimed in claim 7, wherein said annular detent is formed by folding said annular end rim of the cover.

9. A wheel hub unit as claimed in claim 6, wherein said locking means are comprised of a groove formed in said radially outer surface of said hub sleeve portion, said annular end rim of the cover being dented into said groove.

* * * * *